United States Patent [19]

Ballhaus

[11] Patent Number: 4,607,182
[45] Date of Patent: Aug. 19, 1986

[54] MOTOR SPINDLE WITH INTEGRATED BEARING RACES

[75] Inventor: Heribert Ballhaus, Nuremberg, Fed. Rep. of Germany

[73] Assignee: Georg Muller Nurnberg GmbH, Fed. Rep. of Germany

[21] Appl. No.: 691,440

[22] Filed: Jan. 14, 1985

[30] Foreign Application Priority Data

May 26, 1984 [DE] Fed. Rep. of Germany ....... 3419814

[51] Int. Cl.$^4$ ...................... G11B 5/012; H02K 5/173
[52] U.S. Cl. .................................... 310/90; 310/67 R; 360/97; 384/512
[58] Field of Search ........................ 310/90, 67 R, 87; 360/97, 98, 99; 384/512

[56] References Cited

U.S. PATENT DOCUMENTS

| 3,217,196 | 11/1965 | Richards | 310/90 |
| 3,640,593 | 2/1972 | McKee et al. | 384/512 |
| 4,026,614 | 5/1977 | Neder | 384/512 |
| 4,215,907 | 8/1980 | Pohl | 384/512 |
| 4,535,373 | 8/1985 | Schuh | 360/97 |

FOREIGN PATENT DOCUMENTS

| 3340857 | 5/1985 | Fed. Rep. of Germany | 384/512 |
| 121322 | 7/1983 | Japan | 384/512 |
| 842266 | 6/1981 | U.S.S.R. | 384/512 |

Primary Examiner—Patrick R. Salce
Assistant Examiner—D. L. Rebsch
Attorney, Agent, or Firm—Steinberg & Raskin

[57] ABSTRACT

A motor spindle for magnetic disc storage drives includes an outer rotor connected to an inner shaft which is rotatably mounted by an integrated bearing including rolling elements, such as balls, which run in inner and outer races, the outer race being formed in the stator bushing and the inner race being formed in the shaft.

7 Claims, 2 Drawing Figures

MOTOR SPINDLE WITH INTEGRATED BEARING RACES

BACKGROUND OF THE INVENTION

This invention relates generally to motor spindle construction, and more particularly, to the construction of a motor spindle having an inner fixed stator and an outer rotor adapted to rotate with respect to the inner stator.

The invention finds particularly advantageous use in connection with the construction of motor spindles for use in magnetic disc storage drives.

Magnetic disc storage drives used in data processing applications are characterized by the dual requirements of maximum storage capacity and minimum dimensions. These requirements are particularly applicable where the magnetic disc storage drives are utilized in personal ccomputers. In order to achieve maximum storage capacity for a given diameter of a data disc and for a given total height of the disc drive, efficient utilization of the available total height by the disc pack is of great importance.

In one conventional storage disc drive, the spindle is belt driven. In particular, a spindle has a shaft with a flange at its upper end for accommodating the magnetic discs and with a pulley at its lower end around which a drive belt is trained. The drive motor is located laterally adjacent to the disc pack. This arrangement is generally used with disc drives for large discs, i.e. fourteen inch diameter discs.

According to a conventional direct drive arrangement, the disc drive motor is located beneath the spindle and the rotor of a brushless D.C. motor is directly attached to the spindle shaft.

Still another known motor spindle arrangement for disc storage drives which particularly finds use with 5¼ inch diameter discs, utilizes a spindle which is integrated with the shaft of brushless D.C. motor. The spindle is attached to the shaft end at one or both of its sides within the drive enclosure while the shaft does not rotate.

Each standard dimension magnetic disc has a central aperture of a certain standard diameter which determines the outer diameter of the disc carrying spindle. The maximum height of the motor spindle is also governed by the overall height of the entire disc storage drive which is usually standardized. When the height of the disc storage drive is totally occupied by the disc pack, the only available installation space for the motor spindle is the cylindrical bore defined in the disc pack by the aligned central apertures of the magnetic discs and the intervening spacers.

The critical operational ccharacteristics of a disc storage drive are the runup times required for the read heads to lift off the disc surface and for a certain speed to be reached and for the motor to reach operational speed, and the rotational accuracy of the spindle, the latter being determined by the arrangement of the baerings in which the spindle is mounted. The rotational accuracy of the spindle is also a determining factor for obtaining the largest possible number of data tracks per radial unit of length and, therefore, for the storage capacity of the disc storage drive. A short runup time is achieved by a high torque motor while a high rotational accuracy is received by a rigid bearing construction. These requirements have in the past, however, been impossible to achieve simultaneously since the limited installation space available for the motor spindle can be utilized either by a relatively large stator required for high torque motors or by large bearings required for accurate rotation. It would be desirable to provide construction for a motor spindle which could simultaneously satisfy both these requirements.

SUMMARY OF THE INVENTION

Accordingly, it is an object of the present invention to provide a new and improved motor spindle construction which provides both a short runup time for the rotor as well as good rotational accuracy for the spindle.

Stated another way, it an object of the present invention to provide a new and improved motor spindle construction for an outer rotor wherein the relationship of the stator cross-section and the internal surface of the rotor as well as the distance of the bearing and pitch circles of the two ball bearings on which the shaft is mounted are maximized.

It is a particular object of the present invention to provide a new and improved motor spindle in a magnetic data disc storage drive having the above-described features.

Briefly, in accordance with the present invention, these and other objects are obtained by providing one of the ball bearings on which the shaft is mounted, preferably the upper ball bearing, as a so-called integrated bearing wherein the outer bearing race is constituted by a part of the stator bushing. In the case where the invention is applied to a magnetic disc storage drive, such an arrangement facilitates sealing of the area in which the data discs are accommodated from the spindle area thereby preventing contamination by gases which are generated by the lubricant contained in the ball bearings.

DETAILED DESCRIPTION OF THE DRAWINGS

Figure 1:
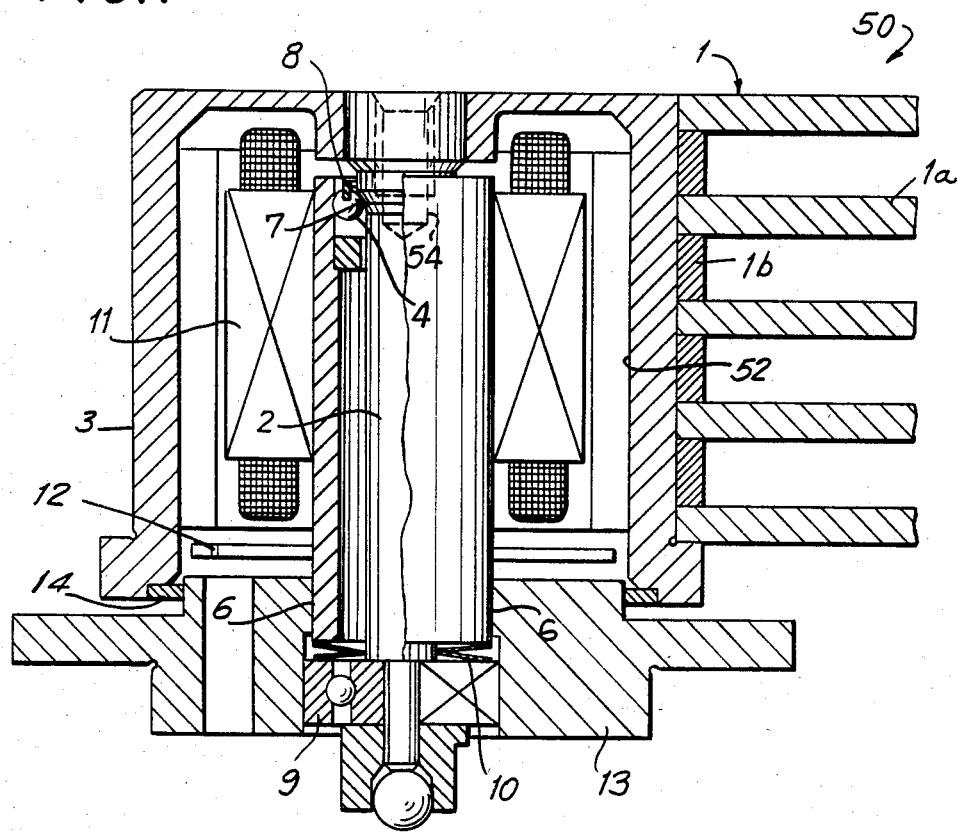
Figure 2:
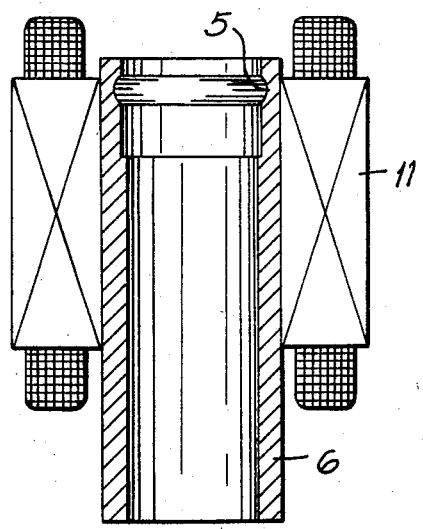

A more complete appreciation of the present invention and many of the attendant advantages thereof will be readily understood by reference to the following detailed description when considered in connection with the accompanying drawings in which:

FIG. 1 is a front elevation view in section of a magnetic data disc storage drive incorporating a motor spindle construction in accordance with the present invention; and FIG. 2 is a front elevation view of the stator bushing and stator winding constituting a component of the motor spindle construction illustrated in FIG. 1.

DESCRIPTION OF THE PREFERRED EMBODIMENT

Referring now to the drawings wherein like reference characters designate identical or corresponding parts throughout the several views, a magnetic disc storage drive, generally designated 50, incorporating the motor spindle construction of the invention is illustrated in FIG. 1. The disc pack 1, only a portion of which is shown in FIG. 1, comprises a plurality of magnetic data discs 1a separated by intervening spacers 1b. The disc pack defines a cylindrical bore or space 52 in which the motor spindle construction of the invention is situated.

The motor spindle comprises an outer rotor 3 which carries the disc pack 1 and an inner central shaft 2 affixed to rotor 3 at its top end by an appropriate threaded fastener 54. The motor spindle further comprises a stator (FIG. 2) including a stator bushing 6 and a stator winding 11 positioned in the space between inner shaft 2 and outer rotor 3.

The shaft 2 is rotatably mounted at its ends in a lower ball bearing 9 and an upper ball bearing 4. In accordance with the invention, upper bearing 4 is a so-called integrated bearing. More particularly, the outer race 5 of bearing 4 is integrally formed on the interior surface of stator bushing 6 while the inner race 7 of bearing 4 is integrally formed on the shaft 2 itself. A self-centering cage 8 is provided to hold the bearing balls to insure easy assembly of the bearing.

Upper bearing 4 is stressed by means of the lower conventional bearing 9 and a Belville spring 10. The stator winding 11, stator bushing 6 and a printed circuit board 12 for acoustic sensors preferably constitute a ready-to-install unit which is press fit into the base plate 13. The area in which the data discs 1a are accommodated is sealed from the area in which bearings 4 and 9 are located by means of any conventional sealing means, such as a fluid seal 14 extending between a collar of rotor 3 and an opposed surface portion of base plate 13.

Significant advantages are obtained by the motor spindle construction of the present invention. Since the rotor is attached to the shaft, its surface can be accurately cylindrically turned prior to assembly. This offers the advantage that the rotor can be cleaned without problems after completion of this operation, while at the same time the rotational accuracy obtained by the motor spindle of the present invention is equivalent to that achieved in the past only where the final assembled spindle is cylindrically turned. With conventional spindle assemblies, the problem of contamination or deterioration of the fluid seal existed, since the seal had to be provided prior to turning the rotor.

In a motor spindle construction in accordance with the invention, wherein the rotor rotates around a shaft which is mounted with the bearings as described above, the entire inner space within the rotor can be sealed by a single seal, i.e., seal 14. Significant assembly costs are saved, in that the motor spindle can be assembled in other than so-called clean rooms. The only steps which must still be performed in uncontaminated areas is during or after filling of the fluid seal, i.e., only final cleaning, performance testing and packaging of the motor spindle. In accordance with the object of the invention, the motor spindle provides optimum relationships between the stator cross-section and the internal surface of the rotor, as well as maximizing the distance of the bearing and pitch circles of the two ball bearings on which the shaft is mounted.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A motor spindle including a brushless D.C. current motor, comprising:
   an outer rotor;
   an inner shaft located within said outer rotor defining an interior space therebetween, said inner shaft being connected to said outer rotor for rotation therewith;
   a stator including a stator bushing located in said space between said inner shaft and said outer rotor, said stator bushing having an inner surface, a region of said inner surface of said stator bushing surrounding a region of said inner shaft in opposed relationship thereto; and
   means for rotatably mounting said inner shaft in said space, said mounting means including an integrated bearing including rolling elements running in inner and outer races, said outer race being formed by said stator bushing in and by said inner surface region thereof and said inner race being formed in and by said opposed region of said inner shaft.

2. The combination of claim 1 further including means for prestressing said integrated bearing.

3. The combination of claim 1 wherein said motor spindle further includes a base plate receiving one end of said stator bushing and wherein said inner shaft mounting means further includes a second bearing housed in said base plate.

4. The combination of claim 3 wherein said motor spindle further includes a single sealing means for sealing said interior space.

5. The combination of claim 3 further including means for prestressing said integrated bearing, said prestressing means including spring means situated between said second bearing and said stator bushing.

6. The combination of claim 5 wherein said integrated bearing comprises an upper bearing and said second bearing is situated in said base plate and comprises a lower bearing.

7. In a magnetic disc storage drive, a motor spindle including a brushless D.C. current motor, comprising:
   an outer rotor having an outer cylindrical surface on which a disc pack is adapted to be mounted;
   an inner shaft located within said outer rotor defining an interior space therebetween, said inner shaft being connected to said outer rotor for rotation therewith;
   a stator including a stator bushing located in said space between said inner shaft and outer rotor, said stator bushing having an inner surface, a region of said inner surface of said stator bushing surrounding a region of said inner shaft in opposed relation thereto; and
   means for rotatably mounting said inner shaft in said space, said mounting means including an integrated bearing including rolling elements running in inner and outer races, said outer race being formed by said stator bushing in and by said inner surface region thereof and said inner race being formed in and by said opposed region of said inner shaft.

* * * * *